D. M. BLISS.
RECTIFIER.
APPLICATION FILED SEPT. 27, 1910.

1,234,439.

Patented July 24, 1917.
2 SHEETS—SHEET 1.

Witnesses:

Inventor:

D. M. BLISS.
RECTIFIER.
APPLICATION FILED SEPT. 27, 1910.

1,234,439.

Patented July 24, 1917.
2 SHEETS—SHEET 2.

Witnesses:
Frank D Lewis
Dyer Smith

Inventor:
Donald M Bliss
by Frank L Dyer
his Atty.

UNITED STATES PATENT OFFICE.

DONALD M. BLISS, OF WEST ORANGE, NEW JERSEY, ASSIGNOR TO THOMAS A. EDISON, INCORPORATED, OF WEST ORANGE, NEW JERSEY, A CORPORATION OF NEW JERSEY.

RECTIFIER.

1,234,439.  Specification of Letters Patent.  Patented July 24, 1917.

Application filed September 27, 1910. Serial No. 584,039.

*To all whom it may concern:*

Be it known that I, DONALD M. BLISS, a subject of the King of Great Britain, and a resident of West Orange, in the county of Essex and State of New Jersey, have made a certain new and useful Invention in Rectifiers, of which the following is a description.

My invention relates to a method of and means for obtaining a uni-directional current from an alternating current circuit for charging storage batteries and for other purposes where such a current is desirable. My object is to provide a simple reliable device of inexpensive construction and high efficiency and one not needing expert care in operation, and to simplify and reduce to a minimum the handling of the apparatus during use. My object is also to devise a novel method of rectifying alternating currents whereby sparking is minimized in an exceedingly simple manner.

My improved apparatus belongs to that type in which a rotatable switch member or commutator is operated in synchronism with the alternating current to be rectified. Such devices have not heretofore proved successful in practice owing to the difficulty of maintaining the collecting brushes and commutator in sparkless condition during varying loads. The destructive nature of this sparking when it does occur is a serious objection to previous devices; also, the rangements necessary for starting a synchronous motor and securing a brush adjustment are more or less complicated in character.

Figure 1:
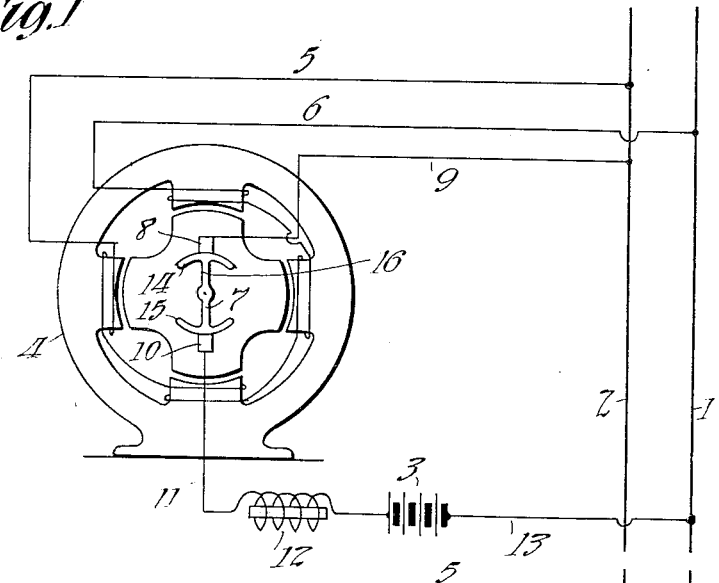
Figure 2:
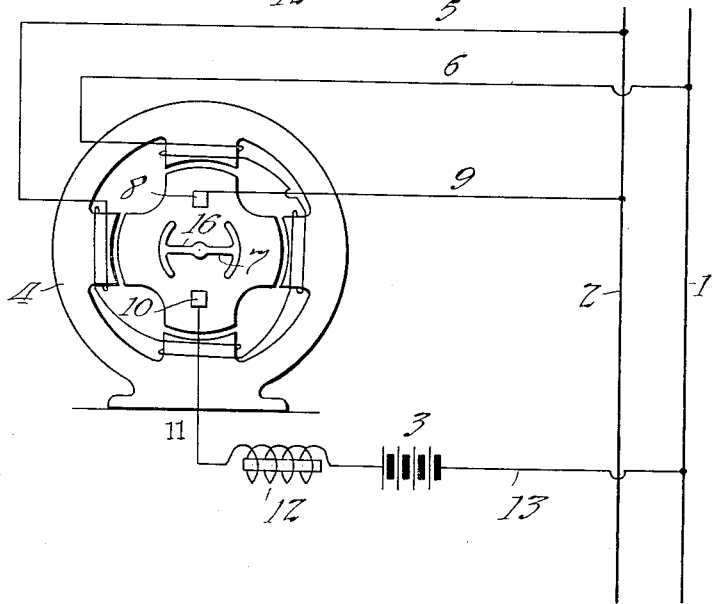
Figure 3:
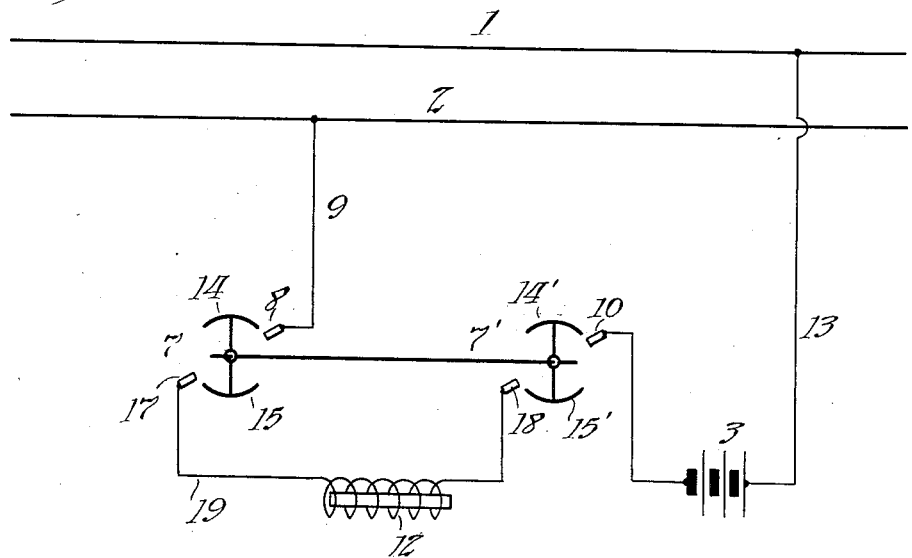
Figure 4:
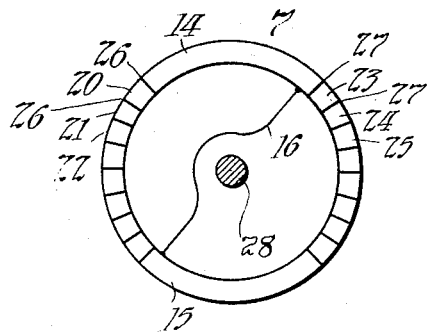
Figure 5:
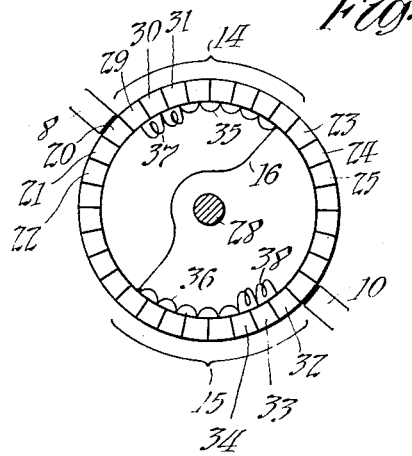

In order that my invention may be more clearly understood, attention is hereby directed to the accompanying drawings forming part of this specification and illustrating my improved method and one form of apparatus by which the same may be carried out. In the drawings, Figures 1 and 2 represent diagrammatically the rectifying switch and connections constructed according to my invention, the switch being shown in different positions in the two figures. Fig. 3 is a diagrammatic view illustrating the connections and mode of operation when a series of switches are employed for the purpose of increasing the total length of the break in the rectified circuit and the speed of the same. Figs. 4 and 5 are diagrammatic views showing two forms of my improved rectifying commutator.

Referring to the drawings, conductors 1, 2 constitute the circuit carrying alternating current which is to be rectified for the purpose of charging the battery 3 or for any other desired purpose. 4 is a synchronous motor, preferably of the induction type. This motor is supplied with alternating current from the mains 1 and 2 by means of conductors 5 and 6 connected across the mains 1 and 2. The commutator or rotatable switch member 7 is connected to rotate with the motor 4, being preferably mounted upon the shaft of the motor. The collecting brush 8 is connected to one side of the alternating current circuit by means of conductor 9 and the receiving brush 10 is connected by conductor 11 with one side of battery 3, the reactance or choke coil 12 preferably being interposed in the connection. The other side of battery 3 is connected to the other side of the alternating current circuit by conductor 13.

In the case of a 4-pole motor, the commutator or switch member 7 is provided with two contacting segments 14 and 15 of the same predetermined length, the switch member 7 rotating between brushes 8 and 10 which are adapted to contact with segments 14 and 15. The contact surfaces of the segments 14 and 15 are preferably arcuate. Segments 14 and 15 are connected together electrically as shown by connection 16. In Fig. 1 segment 14 is shown in contact with brush 8 and segment 15 in contact with brush 10, so that a circuit is completed in series from conductor 2 through conductor 9, brush 8, switch member 7, conductor 11, reactance 12, battery 3 and conductor 13 to conductor 1 of the alternating current circuit. In Fig. 2 the switch is shown in such position that both segments 14 and 15 are out of contact with brushes 8 and 10, in which position there is no flow of current through the rectifier. In the rotation of the switch member, one segment makes contact with one brush simultaneously with the making of contact by the other segment with the other brush, the segments leaving the brushes with which they are in contact simultaneously, providing a pair of gaps or breaks in series when the segments leave the brushes. The segments are so positioned and are of such length that one of the segments contacts the collecting brush 8 only during the times of alternations of one polarity in the alternating current circuit 1, 2, so that a uni-directional current is transmitted from brush 8 through switch member 7 to brush 10 and the circuit to be provided with rectified current. At all times when current of different polarity is flowing in circuit 1, 2, switch member 7 is disconnected from its brushes, and the circuit from the alternating current mains 1, 2 to the battery 3 is interrupted.

It will be noted that this form of commutator provides two breaks or gaps in series when segments 14 and 15 leave the brushes 8 and 10, whereby the sparking is greatly reduced. To still further increase the speed of breaking the circuit and the length of gap, I may use two or more commutators or switch members similar to that shown in Fig. 1, in series with each other and their respective brushes when in contact with the latter. Such a system is illustrated in Fig. 3, in which 7 and 7' are a pair of rotating commutators or switch members mounted upon the shaft of a synchronous motor, such as 4 to rotate together. These switch members are insulated from each other. A pair of brushes 17 and 18 are connected together in series by conductor 19, with which reactance coil 12 may be connected in series, if desired. When one of the segments of switch member 7, as 14, contacts brush 8, the other segment of switch member 7 contacts brush 17 and at the same time one of the segments as 14' of switch member 7', contacts receiving brush 10, while the other segment as 15' of switch member 7' simultaneously engages brush 18, whereby a series connection is established through the switch members and brushes for charging battery 3 with uni-directional current. The active segments of the switch members are in contact with the brushes only while a current half wave or alternation of the desired polarity is passing through the mains 1 and 2 and is impressed upon brush 8. With this arrangement it will be seen that a series of break gaps is provided and that the total length of gap and the speed of break is four times as great, when two switch members as 7 and 7' are employed, as when a single commutator permanently connected to one side of the alternating circuit is employed, which is the arrangement generally used heretofore. It is obvious that I am not limited to the employment of two switch members such as 7 and 7', but that any number of such switch members rotating in unison and adapted to be connected together in series through brushes such as 17 and 18, when the active or conductive sections of the switch members are in contact with such brushes may be employed.

In order to still further improve the operation of my device, I preferably employ an adjustable reactance 12 in circuit with the rectified current. This enables the phase relation between the charging current and the motor current to be varied as the conditions of load and the charging circuit may demand.

In order to secure a high degree of insulation during the inactive period of rotation of the commutators 7, 7', and also to secure good wearing surfaces, I may construct the commutator as shown in Fig. 4, in which 14 and 15 are the two active copper segments connected with each other by connection 16, and 20, 21, 22, 23, 24, 25, etc., are narrow copper segments insulated from each other and from all other parts of the commutator or switch by segments of mica or other insulating material 26, 26, 27, 27, etc. By the use of this construction the desired number of breaks in series is obtained, and at the same time there is provided a commutator surface of uniform wearing quality. The commutator or switch member 7 is mounted upon the motor shaft 28.

If desired, I may use narrow insulated segments for both the active or conductive and dead sections of the commutator, as illustrated in Fig. 5. In this figure, active or conductive sections 14 and 15 are composed of a number of segments 29, 30, 31, etc., and 32, 33, 34, etc., the segments of section 14 being connected together electrically by conductor 35 and the segments of section 15 being connected together electrically by means of conductor 36. The segments 29, 30, 31, 32, 33, 34, etc., and the dead segments 20, 21, 22, 23, 24, 25, etc., are all insulated as explained in connection with Fig. 4. The two active or conductive sections 14 and 15 are connected together as a whole electrically by conductor 16. This arrangement provides an even wearing surface of mica and copper throughout the whole extent of the commutator. Instead of connecting the segments of the active or conductive sections together directly, I may insert a resistance between any desired number of segments in the active sections, as shown in Fig. 5, in which the two trailing or end segments 29, 30 of section 14, and 32, 33 of section 15 are connected with the remaining segments of the active sections by means of resistances 37 and 38, it being understood that the commutator shown in Fig. 5 is rotating in a right-handed direction, the brush 8 having just passed off the last segment 29 of active section 14 and brush 10 having passed off the last segment 32 of section 15. The provision of resistances 37 and 38 will serve to prevent a rush of current and injurious sparking in case of accidental phase displacements or a change in speed or adjustment of the brushes.

From the description of the forms of apparatus which I prefer to use, the operation of the same, and the steps of my improved method of rectifying will be made clear.

Having now described my invention, what I claim and desire to protect by Letters Patent is as follows:—

1. In an alternating current rectifier, a rotatable switch member comprising an annulus of conducting segments separated by insulating material, two groups of adjacent segments being connected together electrically to constitute conductive sections, said sections being separated from each other by unconnected segments and connected together electrically, and resistances interposed in the connections between segments at one end only of each section, substantially as described.

2. In an alternating current rectifying system, in combination, a receiving brush for unidirectional current, a brush connected to a source of alternating current, and means for connecting said brushes in series during the delivery of alternations of current of one polarity only to said receiving brush and breaking said connection each alternation of current at a plurality of points simultaneously, comprising a rotatable switch member, and means for rotating the same synchronously with the alternations of the current to be rectified, said switch member having a pair of conductive sections connected together electrically and positioned each to contact one of said brushes at the same time and break contact therewith simultaneously, said conductive sections being each composed of a plurality of insulated conductive segments connected together electrically, and having resistances interposed between trailing end segments only of each conductive section, substantially as described.

This specification signed and witnessed this 23d day of September, 1910.

DONALD M. BLISS.

Witnesses:
DYER SMITH,
ANNA R. KLEHM.